(12) United States Patent
Dondzik et al.

(10) Patent No.: US 9,106,310 B2
(45) Date of Patent: Aug. 11, 2015

(54) APPARATUS FOR SECURING MEMORY MODULES AND/OR SUBSCRIBER IDENTITY MODULE IN AN ELECTRONIC DEVICE

(71) Applicant: MOTOROLA MOBILITY LLC, Libertyville, IL (US)

(72) Inventors: Daniel P. Dondzik, Elk Grove, IL (US); Paul L. Fordham, Wauconda, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 247 days.

(21) Appl. No.: 13/621,855

(22) Filed: Sep. 18, 2012

(65) Prior Publication Data
US 2014/0078660 A1    Mar. 20, 2014

(51) Int. Cl.
| H05K 5/00 | (2006.01) |
| H05K 7/00 | (2006.01) |
| G06F 1/16 | (2006.01) |
| H01H 3/00 | (2006.01) |
| H01H 13/00 | (2006.01) |
| H01H 21/00 | (2006.01) |
| H04B 1/3816 | (2015.01) |

(52) U.S. Cl.
CPC .................................... *H04B 1/3816* (2013.01)

(58) Field of Classification Search
CPC ....... H05K 7/1409; G06F 1/184; G06F 1/185; G06F 1/186; G02B 6/4246
See application file for complete search history.

(56) References Cited

U.S. PATENT DOCUMENTS

| 5,020,926 | A  | * | 6/1991 | Wilhelm .......................... 400/54 |
| 6,062,889 | A  |   | 5/2000 | Hyland et al. |
| 6,071,134 | A  | * | 6/2000 | Tung ............................. 439/159 |
| 6,392,879 | B1 | * | 5/2002 | Chien ....................... 361/679.33 |
| 6,602,096 | B1 |   | 8/2003 | Kronestedt et al. |
| 6,797,905 | B1 | * | 9/2004 | Wang et al. .................... 200/339 |
| 7,066,748 | B2 | * | 6/2006 | Bricaud et al. ................ 439/159 |
| 7,233,489 | B2 | * | 6/2007 | Toyama et al. .......... 361/679.31 |
| 7,718,911 | B2 |   | 5/2010 | Lin et al. |
| 7,762,827 | B2 | * | 7/2010 | Liu ................................ 439/331 |
| 7,933,123 | B2 |   | 4/2011 | Wang et al. |
| 8,102,645 | B2 |   | 1/2012 | Zhang |
| 8,270,175 | B2 | * | 9/2012 | Duan et al. ..................... 361/737 |
| 8,278,578 | B2 | * | 10/2012 | Yang et al. .................... 200/339 |
| 8,345,416 | B2 | * | 1/2013 | Liang et al. .............. 361/679.31 |
| 8,371,878 | B2 | * | 2/2013 | Tang ............................. 439/630 |
| 2001/0022719 | A1 | * | 9/2001 | Armitage et al. ............. 361/681 |

(Continued)

FOREIGN PATENT DOCUMENTS

CN         201039416       3/2008

OTHER PUBLICATIONS

Patent Cooperation Treaty, International Search Report and Written Opinion of the International Searching Authority for International Application No. PCT/US2013/059370, Nov. 18, 2013, 9 pages.

*Primary Examiner* — Hoa C Nguyen
*Assistant Examiner* — Xanthia C Cunningham
(74) *Attorney, Agent, or Firm* — Morris & Kamlay LLP

(57) ABSTRACT

An apparatus for securing a memory module or SIM within an electronic device includes an external control (such as a volume control, camera button, or power button) that hides the memory module and/or SIM. When attached to the electronic device, the external control is disposed at the entrance of a cavity in which the memory module and/or SIM is located. The external control may be attached to a tray that holds one or more SIM cards and/or SD cards.

21 Claims, 9 Drawing Sheets

(56) References Cited

U.S. PATENT DOCUMENTS

| | | | |
|---|---|---|---|
| 2002/0078297 A1* | 6/2002 | Toyama et al. | 711/115 |
| 2004/0092149 A1* | 5/2004 | Scuteri et al. | 439/326 |
| 2005/0059858 A1* | 3/2005 | Frith et al. | 600/118 |
| 2005/0275995 A1* | 12/2005 | Noguchi et al. | 361/160 |
| 2007/0037431 A1* | 2/2007 | Feng et al. | 439/328 |
| 2007/0060198 A1* | 3/2007 | Kuo | 455/558 |
| 2007/0246340 A1* | 10/2007 | Zhao et al. | 200/339 |
| 2009/0091626 A1* | 4/2009 | Kaplan et al. | 348/207.1 |
| 2009/0152087 A1* | 6/2009 | Wang | 200/339 |
| 2010/0055948 A1 | 3/2010 | Zuo | |
| 2010/0063891 A1* | 3/2010 | Townsend et al. | 705/26 |
| 2010/0126839 A1* | 5/2010 | Basilico | 200/339 |
| 2010/0264851 A1* | 10/2010 | Dellian | 315/312 |
| 2011/0133998 A1* | 6/2011 | Hobson et al. | 343/702 |
| 2011/0255252 A1* | 10/2011 | Sloey et al. | 361/752 |
| 2011/0259722 A1* | 10/2011 | Alderson et al. | 200/339 |
| 2011/0312270 A1 | 12/2011 | White | |
| 2012/0224330 A1* | 9/2012 | Liu et al. | 361/726 |
| 2013/0005166 A1* | 1/2013 | Lim et al. | 439/157 |
| 2013/0240629 A1* | 9/2013 | Pesonen et al. | 235/486 |

* cited by examiner

APPARATUS FOR SECURING MEMORY MODULES AND/OR SUBSCRIBER IDENTITY MODULE IN AN ELECTRONIC DEVICE

TECHNICAL FIELD

The disclosure relates generally to securing memory modules and subscriber identity modules (SIMs) in electronic devices, and, more particularly, to an apparatus for securing a memory and/or SIM in an electronic device, wherein an external control of the device hides the memory module and/or SIM.

BACKGROUND

Electronic devices such as cellular phones, tablets, music players, cameras, etc., often need SIMs and/or memory modules. A SIM stores information regarding the user or user account associated with the device. The information on a SIM is used by a communication network to control and configure access by the device to the network. Currently, the most common form factor of a SIM is a card, and thus a SIM is commonly referred to as a SIM card. A SIM card can be transferred between different devices. SIM cards have become more miniaturized over the years. They may come in a variety of sizes, including a full-size SIM $1^{st}$ form factor (1FF), a mini-SIM $2^{nd}$ form-factor (2FF), a micro-SIM $3^{rd}$ form-factor (3FF), and a nano-SIM $4^{th}$ form-factor (4FF). The 4FF SIM can be put into adapters for use as a 2FF or 3FF SIM, thus making it backward compatible. On some cellular networks, a mobile device is locked to its carrier SIM card, meaning that the device only works with SIM cards from the specific carrier.

Electronic devices may use memory modules to store photos, videos, music, and documents. A commonly used memory module is a Secure Device (SD) card. Types of SD cards include the standard SD, the miniSD, and the microSD (originally named the TransFlash or TF). The microSD (uSD) is smaller than the standard SD and the mini SDS.

BRIEF DESCRIPTION OF THE DRAWINGS

Various embodiments of the present invention will be described below in more detail, with reference to the accompanying drawings.

It is to be noted, however, that the appended drawings illustrate embodiments of this invention and are therefore not to be considered limiting of its scope, for the invention may admit to other equally effective embodiments.

DETAILED DESCRIPTION

Figure 1:
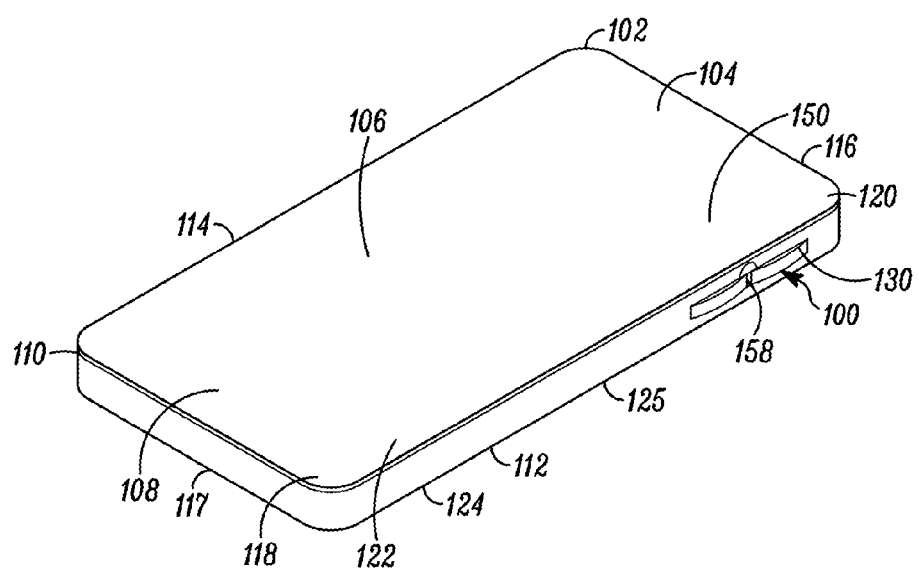
FIG. 1 is a top perspective view of an electronic device with a holding tray in a closed position in accordance with an embodiment of the invention.
Figure 2:
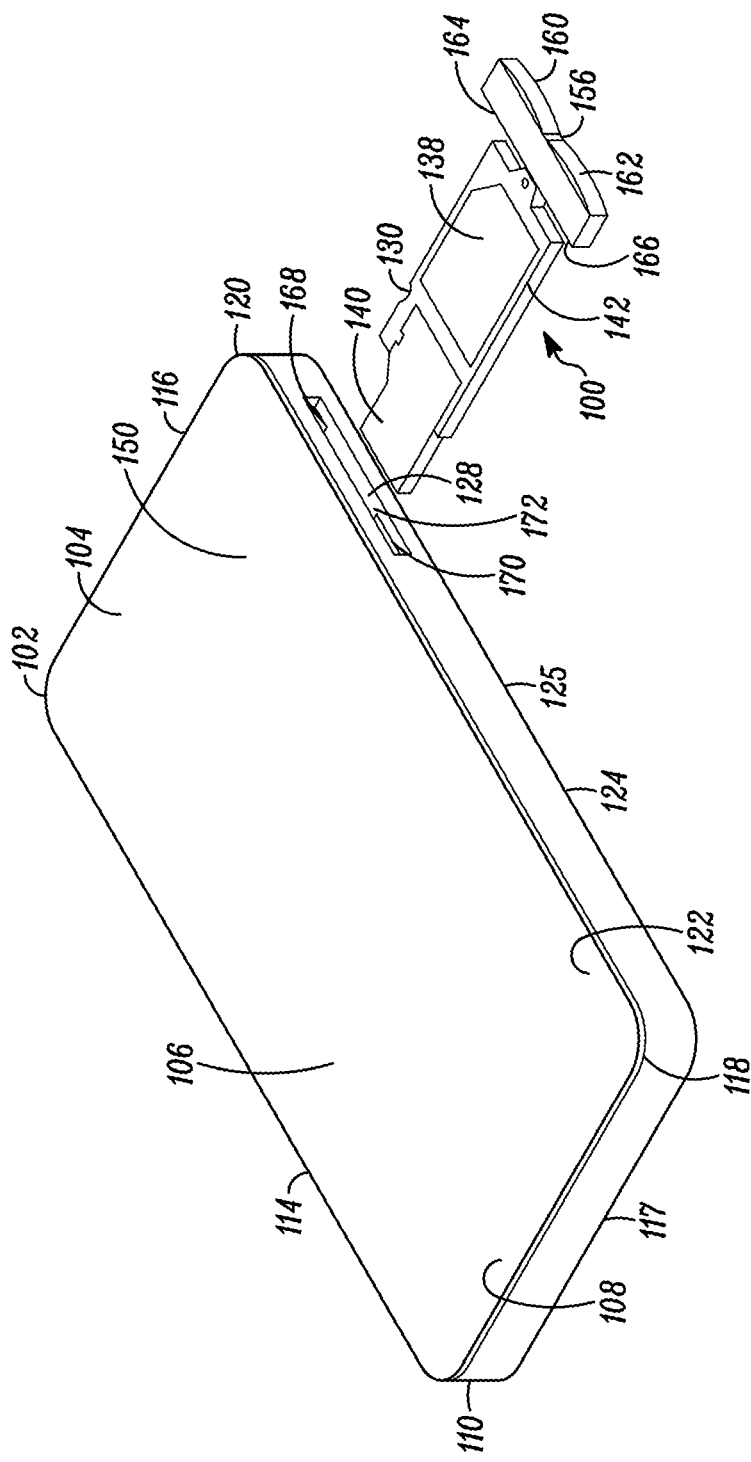
FIG. 2 is a top perspective view of an electronic device with a holding tray in an open position in accordance with an embodiment of the invention.
Figure 3:
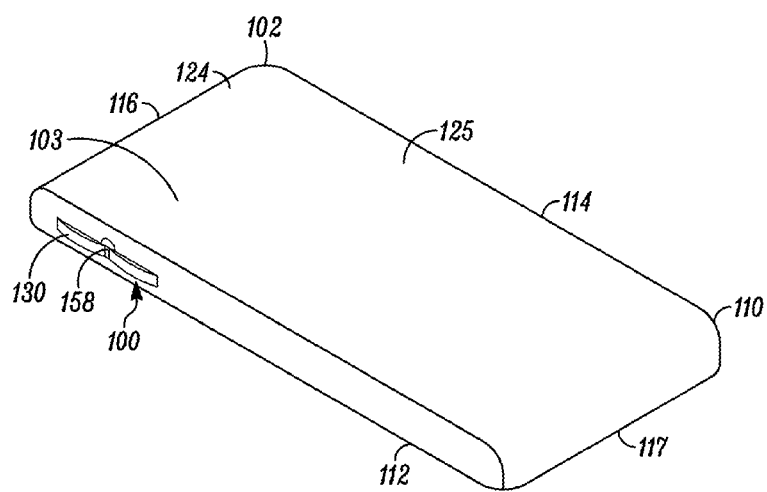
FIG. 3 is a bottom perspective view of an electronic device with a holding tray in a closed position in accordance with an embodiment of the invention.
Figure 4:
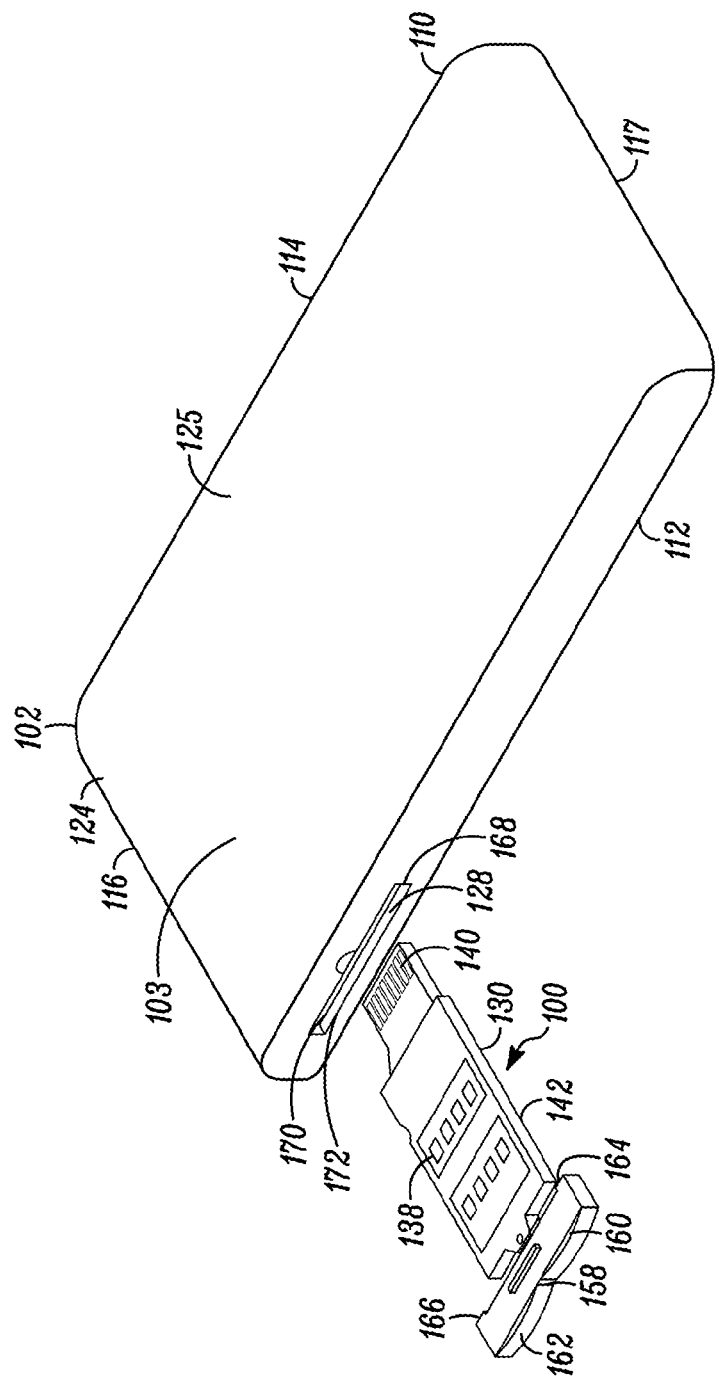
FIG. 4 is a top perspective view of an electronic device with a holding tray in an open position in accordance with an embodiment of the invention.

In accordance with the foregoing, an apparatus for securing memory modules and SIMs in an electronic device will now be described. In an embodiment of the invention, a holding tray carries a SIM and a memory module, multiple memory modules, multiple SIMs, or a combination thereof. The holding tray is secured inside the electronic device. An external control (such as a volume control, a power control, or camera control) of the electronic device is part of, and hides the holding tray. The external control may be configured as, for example, a rocker control, slider or push button. The external control may interact with an internal control of the electronic device, such as a rocker-type switch actuator, button, or slider. When the holding tray is removed from the electronic device, a user may remove SIMs or memory modules from the tray, or place SIMs or memory modules within the tray. The holding tray may be a single tray (e.g., a single SIM or SD card tray) or a multi-module tray (e.g., a dual card inline tray).

According to another embodiment of the invention, the external control is not part of a holding tray, and no holding tray may be present. Instead the external control is a stand-alone structure that can be attached to the external device to hide the memory module and/or SIM, and can be removed from the electronic device to allow access to the memory module or SIM. The memory module or SIM may be held within the electronic device by a push-push connector, in which case the external control hides the memory module or SIM and the push-pull connector.

The apparatus described herein may be designed and arranged to eliminate product entry points, increase usable antenna space, and decrease or prevent the ingress of water and other liquid into the interior and into the electronic circuitry of the electronic device. In many implementations, no additional cover will be required for the memory module or SIM that would impact the cosmetic appearance and overall design of the electronic device.

Moreover, the external control may have a natural protrusion on which a fingernail notch can be cut, which can allow for a tool-less extraction or removal of the memory module or SIM by the user. Of course, the external control may also be one for which a tool is used, such as when the external control is configured to be flush with the exterior surface of the electronic device.

The apparatus described herein may allow for increased printed circuit board area for electronic devices. Moreover, the modular manufacturability of the external control (or external control/tray combination) may allow various colors and cosmetic shapes to be applied to the external control at late stages of production.

In one embodiment, a holding tray assembly comprises: a holding tray, an electronic device having an external control, and a tray-receiving opening for receiving the holding tray. The holding tray can have at least one receiving opening for receiving a SIM or memory module (such as a SIM card or SD card). The holding tray can include an external control disposed on one end of the tray. The external control may be operatively associated with an internal switch that controls various functions of the electronic device (e.g., volume, power, and camera). The holding tray can be moveable from an open position extending outwardly from the electronic device for access to said SIM or memory module to a closed position disposed and positioned in the tray-receiving opening in an interior of said electronic device for substantially preventing access to the SIM or memory module.

Prior to describing further embodiments of the invention, it should be noted that, although the drawings and specific description refer to SIM cards and SD cards (and their variants), the holding tray and push-push connector may be configured to carry SIMs and memory modules having other form factors (e.g., films or blocks).

It is also to be understood that, although the external control shown in the drawings is a rocker-type volume control, the external control may be implemented in a variety of ways, including a power control, or a camera control. Also, in addition to the rocker-type structure shown in the figures, the external control may be implemented as, for example, a button or slider.

For convenient reference, the term "data card" is used to refer to SIM cards, SD cards, and other generally card-shaped data-carrying devices.

Referring to FIGS. 1-4 of the drawings, an embodiment of the invention will now be described. An electronic device system 100 includes an electronic device 102 (which may be implemented as, for example, a smartphone, tablet computer, or music player) can comprise an electronic visual display 104 (FIGS. 1 and 2) for displaying images 106. The electronic visual display can comprise a user interface (UI) 108. The electronic visual display can comprise a screen, such as an impact resistant screen, a display screen, a touchscreen, a screen with an accelerometer, or as any other suitable arrangement. A modular impact-resistant housing 110 can have substantially parallel longitudinal sides 112 and 114, and substantially parallel lateral sides 116 and 117, which can extend between and be connected to the substantially parallel longitudinal sides. The housing can also have a front 118 comprising a generally rectangular frame 120 with a front surface 122 and can have a back 124 with a back surface 125. The frame can be positioned peripherally about and secure the electronic visual display.

Figure 8:
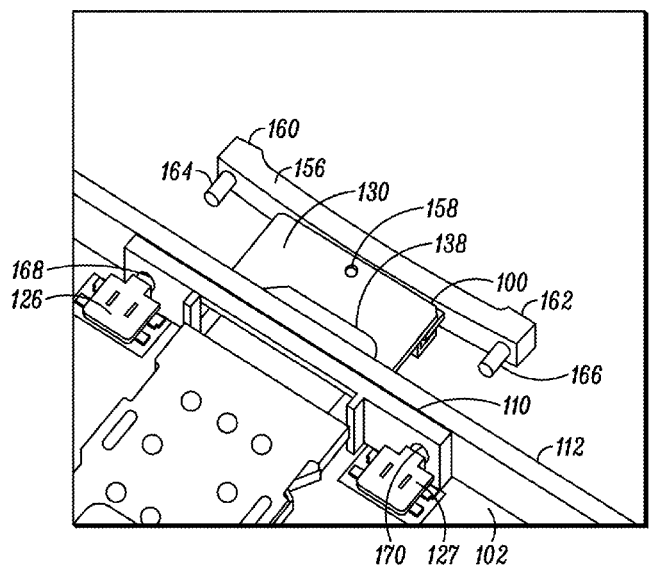
FIG. 8 is an enlarged top perspective view of the holding tray in a partially open position in accordance an embodiment of the invention.
Figure 9:
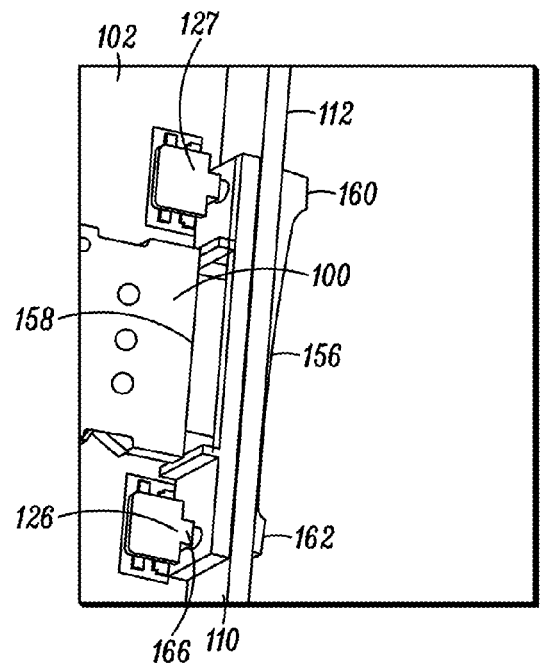
FIG. 9 is an enlarged top view of the holding tray in a closed position with the left volume down actuator of the control knob engaging the volume down switch in accordance with an embodiment of the invention.

As shown in FIGS. 8 and 9, the electronic device can comprise one or more longitudinally spaced electronic switches, including a right switch 126, which increases the level of sound (volume) emitted from the electronic device, and a left switch 127, which decreases and softens the level of sound (volume) emitted from the electronic device.

The housing can have a tray-receiving opening 128 (FIGS. 2 and 4) for receiving an elongated holding tray 130. The tray-receiving opening can be: a slot, notch, fingernail notch, hole, recessed opening, cavity, tool-receiving opening, or any other suitable opening. The holding tray can have at least one card-receiving opening 132, 134 and/ or 136 (FIG. 5) for receiving at least one data card 138 or 140 and card-supporting surfaces 142 that can be positioned adjacent and in proximity to the card-receiving opening(s) for supporting, abuttingly and snugly engaging, and cushioning the data card. The data card receiving opening(s) can be a cavity, a rectangular-card-receiving opening, a cutout, a cutaway, an undercut, a stepped opening, hole, pad, pocket or any other suitable opening. The holding tray can move and slide laterally outwardly at an open position extending outwardly from the electronic devices for access to the data card and subsequently move and slide laterally inwardly to a closed position located in the tray-receiving opening in an interior of the electronic device for substantially preventing access to the data card.

Figure 5:
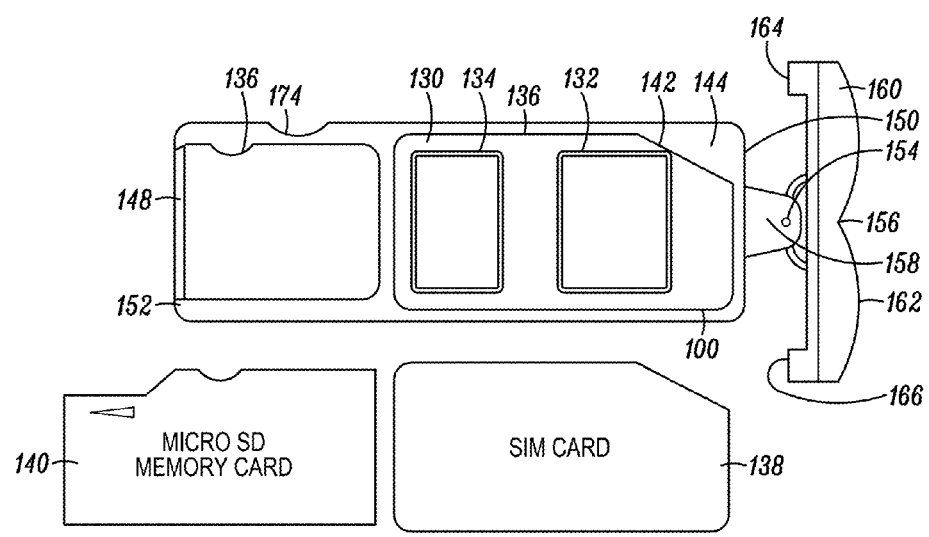
FIG. 5 is an enlarged top plan view of a holding tray prior to receiving a SIM card and SD card in accordance with an embodiment of the invention.
Figure 6:
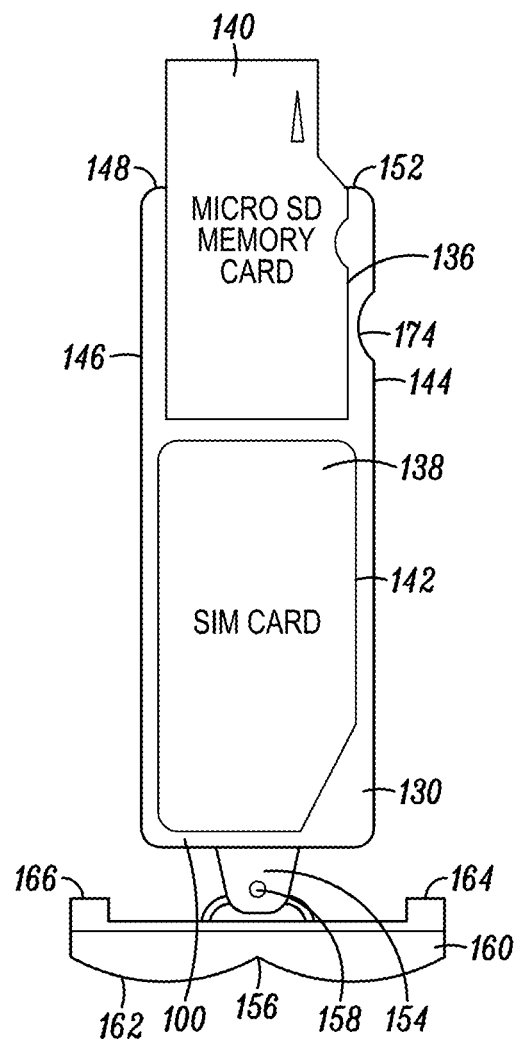
FIG. 6 is an enlarged top plan view of a holding tray with a SIM card and SD card in accordance with an embodiment of the invention.

As shown in FIGS. 5 and 6, the holding tray can have substantially parallel elongated sides 144 and 146, and transverse ends providing a back end 148 and a front end 150 that extend longitudinally across and connect the sides about right angles. The corners 152 of the tray can be rounded. The central part of the front end can have an outwardly and laterally extending convex protuberance 154 providing a rounded nose and pivot point. An external control 156 (depicted as an elongated rocker arm) can be pivotally connected to the pivot point by a pivot pin 158. The external control can face outwardly and can have a greater longitudinal span and width than the sides of the tray.

The external control of the holding tray can be operatively connected to the switches for controlling various functions of the electronic device. For example, when implemented as a volume control, the external control may be used to regulate and adjust the loudness and softness of an audible signal and sound emitted from the electronic device. In the illustrated embodiment, the right volume up rocker portion 160 (FIGS. 5 and 6) of the rocker arm can pivot counterclockwise to increase the volume and sound of the electronic device while the left volume down rocker portion 162 of the rocker arm can pivot clockwise to decrease the volume and sound of the electronic device or vice versa.

Figure 7:
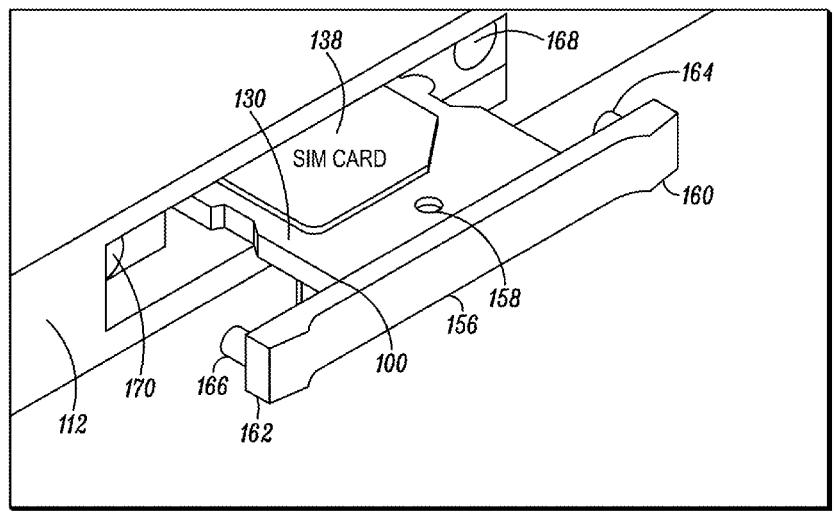
FIG. 7 is an enlarged front perspective view of the holding tray in a partially open position in accordance with an embodiment of the invention.

The external control can have inwardly extending plugs 164 and 166 providing switch actuators (FIGS. 2 and 4-6) which can comprise inwardly facing rectangular or cylindrical plungers that provide electrical contacts. The electronic device can have a pair of longitudinally spaced receptacles 168 and 170 (FIGS. 2, 4 and 7), which can provide actuator access points (access openings) which can be operatively connected to the volume switches. The receptacles can provide sockets for receiving the electrical contacts (pins) of the switch actuators of the external control when the tray is in the closed position. The switch actuators can be aligned with actuator access points and volume switches so that when the tray is pushed inwardly in the closed position the switch actuators will pass through the access points and engage and contact the volume switches as the right or left portion of the rocker arm is pressed to increase or decrease the volume (sound) as desired by the user.

The external control may be used when the tray is in the closed position regardless of whether a data card is in the tray. In the open position of the tray, the external control can be substantially prevented from adjusting, controlling or regulating the electronic device.

The external control itself may include a ledge that defines a cavity, such that an object (such as a tool or fingernail) can be inserted into the cavity, engage the ledge, and pulled outwardly so as to slide the external control along with the tray out of the tray-receiving opening. The external control may also cooperate with a flexible member or spring loaded device, so that the external control may be removed by pressing on its surface, or by inserting a pointed tool into an exposed hole in the external control to actuate the flexible member or spring loaded device.

Figure 10:
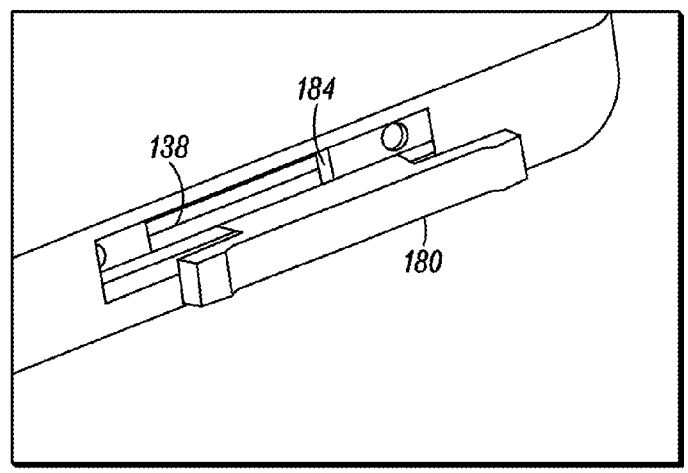
FIGS. 10 & 11 depict an alternate embodiment of the invention.
Figure 11:
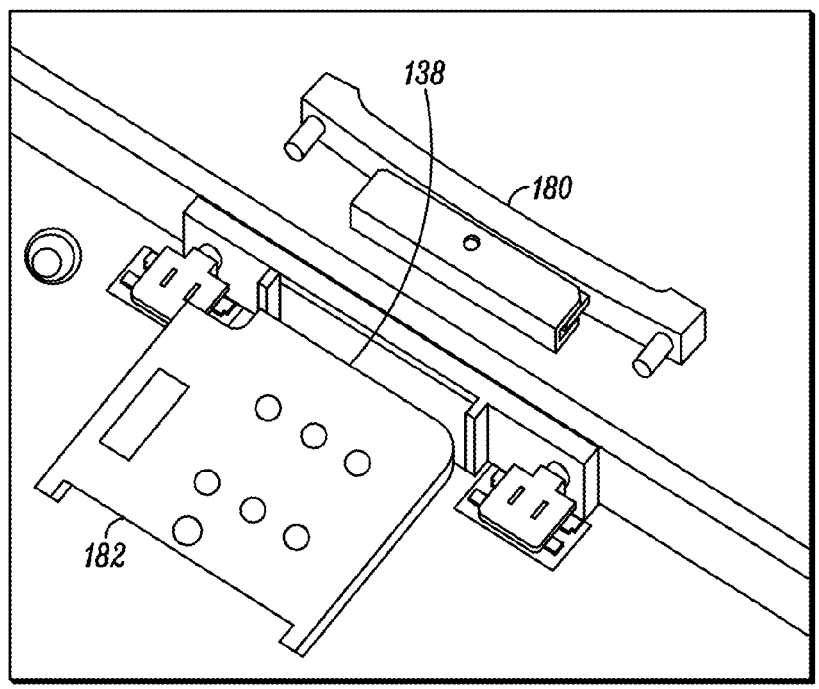

In an alternate embodiment of the invention, the external control described herein need not be used in conjunction with a holding tray. Referring to FIGS. 10 and 11, for example, the data card 138 does not sit in a tray, but rather is held within the electronic device by a push-push connector 182. To insert the data card 138 in to the push-push connector, the data card is pushed into a slot 184 until it engages with, and is secured by the push-push connector (for example, in a spring-loaded manner). The external control is then attached to the electronic device at the opening of the slot, thereby hiding the data card and the push-pull connector. When attached, a portion of the external control may extend into the slot.

To remove the data card, the external control is removed from the electronic device (e.g., by fingernail or with a tool), and the data card is pushed further into the slot 184 until the push-push connector releases the data card. In this embodiment, the external control 180 (which is depicted as a volume control) acts as a door or a cover that hides the push-push connector and the data card. Except for the absence of the tray, the external control 180 may be implemented in the same manner, with the same structure, and interact with internal switches in the same manner, as the external control described in conjunction with FIGS. 1-9.

The external control can also be implemented as: a switch actuator with a tactile contact, volume key, volume button, volume up button, volume down button, rocker arm, volume dial, volume knob, colored control, power button, camera button, video button, or as any other suitable control.

The electronic switch with which the external control interacts can comprise: a switch, tactile switch, surface mounted tactile (SMT) switch, modular switch, rocker switch, colored switch, or any other suitable component.

In those implementations using a holding tray, the holding tray can comprise a generally rectangular tray, a removable tray, a slidable tray, or any other suitable component. The tray can be molded of fabricated of plastic, aluminum or other light weight metal, a composite material, or any other suitable material. The tray-receiving opening may be implemented in a variety of ways. For example, it can include elongated transverse grooves which can provide rails or tracks 172 (FIGS. 2 and 4) for slidably receiving the holding tray. The holding trays can have detents 174 (FIGS. 5 and 6) providing track-engageable locks for interlockingly engaging the tracks and securing the tray when the tray is in the closed position.

The electronic device can also include one or more electronic data card readers 150 for reading the data cards.

The memory module or SIM may have any suitable format and any suitable form factor. For example, the SIM may be a subscriber identity module card (SIM card), full-size SIM $1^{st}$ form factor (1FF) card, mini-SIM $2^{nd}$ form-factor (2FF) card, micro-SIM $3^{rd}$ form-factor (3FF) card, nano-SIM $4^{th}$ form-factor (4FF) card. The memory module may be, for example, a secure device card (SD card), standard SD card, miniSD card, microSD (uSD) card, memory card, storage card, expanded external memory card.

The electronic device can comprise a portable electronic device selected from the group consisting of: a radiotelephone, cellular (cell) phone, mobile phone, smart phone, qwerty phone, flip phone, slider phone, android phone, tablet phone, camera phone, clamshell device, portable networking device, portable gaming device, mobile communications device, personal digital assistant (PDA), wireless e-mail device, a two way pager, internet communication device, electronic reading device, incoming call notifier, answering machine, computer, or any other suitable device.

Although embodiments of the invention have been shown and described, it is to be understood that various modifications, substitutions, and rearrangements of parts, components, and/or process steps can be made by those skilled in the art without departing from the novel spirit and scope of this invention.

What is claimed is:

1. An apparatus for securing a SIM or memory module within an electronic device, the electronic device having a cavity that is accessible from a surface of the electronic device, the apparatus comprising:
   an external control that controls an internal switch that controls an electronic a function of the electronic device, wherein the external control is attachable to, and removable from, the electronic device at the entrance of the cavity;
   wherein the external control is part of, and hides a holding tray that holds a SIM or memory module disposed within the cavity.

2. The apparatus of claim 1, wherein the holding tray is attached to the external control, and wherein the holding tray extends into the cavity when the external control is attached to the electronic device.

3. The apparatus of claim 2, wherein the SIM is a SIM card, the memory module is an SD card, and the holding tray holds one or more of the SIM card and the SD card.

4. The apparatus of claim 1, wherein the function controlled by the external control is selected from a group consisting of volume, camera functionality, and power.

5. The apparatus of claim 1, wherein the external control is removable by hand from the electronic device.

6. The apparatus of claim 1, wherein the external control is removable from the electronic device using a tool.

7. The apparatus of claim 1, wherein the external control includes at least one of a rocker control, a slider, and a push button.

8. The apparatus of claim 1, wherein the external control is a stand-alone structure that is attachable to, and removable from, the electronic device at the entrance of the cavity.

9. An assembly comprising:
   a holding tray;
   an electronic device having at least one switch and tray-receiving opening for receiving said holding tray;
   said holding tray having at least one opening for receiving a SIM or memory module;
   said holding tray having an external control that is part of, and hides the holding tray, the external control operatively associated with said switch for controlling a function of said electronic device; and
   said holding tray being moveable from an open position extending outward from said electronic device for access to said memory module or SIM to a closed position disposed in said tray-receiving opening in an interior of said electronic device for substantially preventing access to said memory module or SIM.

10. The assembly of claim 9, wherein said external control regulates the volume of the electronic device.

11. The assembly of claim 9, wherein said external control activates a video function of the electronic device.

12. The assembly of claim 9, wherein said external control turns the electronic device on or off.

13. The assembly of claim 9, wherein said external control is substantially prevented from being adjusted and controlling electronic device in the open position of said tray.

14. The assembly of claim 9 wherein:
   said external control comprises a switch actuator with a tactile contact; and
   said external control has a manually graspable portion for pulling said external control outwardly from said electronic device.

15. The assembly of claim 9, wherein said tray-receiving opening is selected from the group consisting of: a slot, notch, fingernail notch, hole and combinations of any of the preceding.

16. The assembly of claim 9, wherein:
the memory module is an SD card, and the SIM is a SIM card, and said tray comprises a card-supporting surface for supporting at least one of said SD card or SIM card, said card-supporting surface being positioned in proximity to said card-receiving opening.

17. The assembly of claim 9, wherein said external control is selected from the group consisting of:
volume key, volume button, volume up button, volume down button, rocker arm, volume dial, volume knob, power on-off button, camera button, and combinations of any of the preceding; and
said switch is selected from the group consisting of: switch, tactile switch, surface mounted tactile (SMT) switch, modular switch, rocker switch, colored switch, and combinations of any of the preceding.

18. A holding tray assembly, comprising:
a holding tray;
an electronic device comprising, at least one external control, an electronic visual display for displaying images, a chassis comprising a housing providing a frame positioned about and securing said electronic visual display, and a tray-receiving opening in said housing for receiving said holding tray;
said electronic visual display comprising a user interface;
said housing having a front comprising a generally rectangular frame with a front surface and having a back with a back surface;
said holding tray having at least one card-receiving opening for receiving a data card and a card-supporting surface position about said card-receiving opening for supporting said data card;
wherein said external control is integrated with the holding tray so as to be part of, and hide, the holding tray and is operatively connected to an internal switch for controlling an electronic function of said electronic device;
said holding tray being moveable from an open position extending outwardly from said electronic device for access to said data card to a closed position located in said tray-receiving opening in an interior of said electronic device for substantially preventing access to said data card.

19. The holding tray assembly of claim 18 wherein
said external control provides an access door for accessing said data card;
said external control has inwardly extending plugs providing contacts;
said electronic device has a pair of longitudinally spaced receptacles operatively connected to a volume switch, said receptacles providing sockets for receiving said contacts of said external control when said tray is in the closed position;
said external control has a manually graspable portion for pulling said external control outwardly from said electronic device, and said manually graspable portion selected from the group consisting of: a pull tab, tab, lip, tongue, finger-nail grippable portion, ledge, indent, and combinations of any of the preceding; and
said function controlled by the external control is selected from a group consisting of: volume, camera, and power.

20. The holding tray assembly of claim 18 wherein
said external control is selected from the group consisting of: a switch actuator with a tactile contact, volume key, volume button, volume up button, volume down button, rocker arm, volume dial, volume knob, colored external control, power button, camera button, and combinations of any of the preceding; and
said switch is selected from the group consisting of: switch, tactile switch, surface mounted tactile (SMT) switch, modular switch, rocker switch, colored switch, and combinations of any of the preceding.

21. The holding tray assembly of claim 18 wherein:
said tray-receiving opening is selected from the group consisting of: a slot, notch, fingernail notch, hole, recessed opening, cavity, and combinations of any of the preceding;
said data-card receiving opening is selected from the group consisting of: cavity, a rectangular-card-receiving opening, a cutout, a cutaway, an undercut, a stepped opening, hole, pad, pocket and combinations of any of the preceding;
said holding tray is selected from the group consisting of a generally rectangular tray, a removable tray, a slidable tray, and combinations of the preceding; and
said data card is selected from the group consisting of: a subscriber identity module card (SIM card), full-size SIM 1st form factor (1FF) card, mini-SIM 2nd form-factor (2FF) card, micro-SIM 3rd form-factor (3FF) card, nano-SIM 4th form-factor (4FF) card, secure device card (SD card), standard SD card, miniSD card, microSD (uSD) card, memory card, storage card, expanded external memory card, and combinations of any of the preceding.

* * * * *